Figure 1:
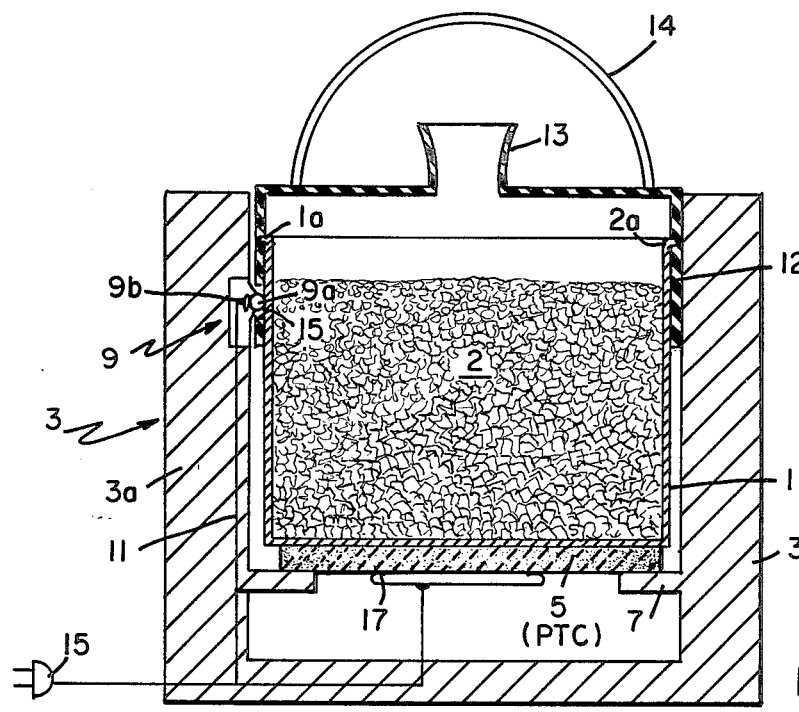

United States Patent [19]

Manchester

[11] Patent Number: 4,731,522

[45] Date of Patent: Mar. 15, 1988

[54] INSECTICIDE DISPENSER WITH A PTC HEATER

[75] Inventor: Steven T. Manchester, Limerick, Me.

[73] Assignee: GTE Products Corporation, Stamford, Conn.

[21] Appl. No.: 892,613

[22] Filed: Aug. 4, 1986

[51] Int. Cl.⁴ .......................... H05B 3/14; A61L 9/03
[52] U.S. Cl. ................................. 219/275; 219/272; 219/518; 219/504
[58] Field of Search ............... 219/271, 272, 273, 274, 219/275, 276, 518, 433, 504, 505; 422/305, 306, 125; 43/129; 239/135, 136, 51.5, 53, 54–60

[56] References Cited

U.S. PATENT DOCUMENTS

| | | | |
|---|---|---|---|
| 1,102,424 | 7/1914 | McNabb | 219/272 |
| 1,908,054 | 5/1933 | Riley | 219/275 |
| 2,611,069 | 9/1952 | Frazier | 219/518 |
| 2,612,432 | 9/1952 | Boddy | 219/272 |
| 2,660,828 | 12/1953 | Abrams | 219/272 |
| 2,690,500 | 9/1954 | Winberg | 219/272 |
| 2,692,327 | 10/1954 | Avrigan | 219/272 |
| 3,079,485 | 2/1963 | Groves | 219/518 |
| 4,163,038 | 7/1979 | Nishimura | 219/275 |

*Primary Examiner*—E. A. Goldberg
*Assistant Examiner*—Teresa J. Walberg
*Attorney, Agent, or Firm*—James Theodosopoulos

[57] ABSTRACT

An insecticide dispenser capable of initiating the volatilization of a charge of insecticide to fumigate a room. The dispenser includes a container for the insecticide that is disposed upon a PTC heater. One side of the power supply necessary to initiate the chemical reaction passes directly through the cannister to the PTC heater. The other side of the power supply is connected through a support upon which the PTC heater rests. In the preferred embodiment, an electrical cut-off device is included in the circuit which will turn off the power when a predetermined temperature is attained which will be indicative of the initiation of the self-sustaining chemical reaction that causes the dispensing of the insecticide into the room.

9 Claims, 4 Drawing Figures

INSECTICIDE DISPENSER WITH A PTC HEATER

FIELD OF THE INVENTION

The present invention relates to electrically heated insecticide dispensers for rooms and particularly to those which are adapted to disperse a charge of insecticide from a container which is to be used only once and in which, preferably, the insecticide dispenser can shut itself off automatically when the charge has been dispensed.

SUMMARY OF THE PRIOR ART

Insecticide dispensers are well known to the art and devices have previously been introduced which are adapted to dispense insecticides into a room when a container is heated. For example, the U.S. Pat. No. 4,391,781 to van Lit, discloses a resistance heating device that can be utilized with a strip of paper that has been impregnated with an insecticide. The paper strip is urged against the resistance heater so that when the current is turned on, it will dispense the insecticide that is held on the paper. The paper is held against the resistance heating element by a clamp arm that presses the mat against the surface. A depressible lever engages the clamp arm and moves it away from the heating surface thereby releasing the paper strip to facilitate its replacement. In the van Lit patent, however, no disclosure is made of a container of insecticide and the limiting of the dispensing is controlled by the amount of vaporizable material that is held within the paper. No disclosure is made in the van Lit patent of making the container that holds the vaporizable material part of the electrical circuit that heats it.

Since the present invention relates to dispensers for insecticides that utilize cannisters which are to be used only once, it is necessary to turn off the resistance heating element when the vaporizable material is fully dispersed into the room. The usual approach for dispensing such vaporizable material is to initiate the vaporization and then quickly leave the room where the dispenser has been placed. The room is not reentered until quite a while later, when the vapor has settled and is not toxic to the person who is doing the fumigation. When using PTC heaters that only attain a predetermined temperature, the possibility that the dispenser could overheat and cause a fire is markedly reduced. Thus, while the van Lit patent may be appropriate for dispensing certain small quantities of volatilizable material, I have found that it is inappropriate for large scale fumigation of entire rooms.

The U.S. Pat. No. 4,202,472 to Lin, discloses the use of a device for bagging trash and simultaneously dispensing insecticides or, repellents. The insecticide or repellent is slowly dispensed into the trash to prevent the breeding of micro-organisms. The device does not involve the use of electrical heating for the container and dispenser and thus is not adaptable for use for fumigating a room. The U.S. Pat. No. 4,316,279 to Beacham, discloses a combined container and dispenser for dispensing a volatile product such as an air freshener or insecticide. The invention involves a continuous, low rate dispensing of the volatile product in an ambient atmosphere and is especially not related to the sudden volatilization of large quantities of insecticides such as are contemplated in the present invention. The invention of Beacham is designed to be unobtrusively stuck or hung to a hidden surface so that it is not normally observable by persons nearby whereby the vaporizable material will slowly disperse into the room where it is disposed.

Automated aerosol mist dispensers are disclosed in U.S. Pat. No. 3,974,941 to Mettler, Patentee discloses a device for injecting short bursts of an atomized liquid such as air fresheners, medicines or insecticides at desired intervals from a spray nozzle in communication with a conventional aerosol can that contains a fluid under pressure. With Mettler's invention, an automated aerosol mist dispenser is disclosed that affords a secure interconnection between the pressurized can of fluid and the control valve mechanism and which is safe against undue leakage, even at relatively high temperatures owing to the provision of a balancing piston feature. No concept, however, is disclosed by Mettler for dispensing a large volume of insecticide into a room in a single charge through the use of a PTC resistance heating element.

U.S. Pat. Nos. 3,151,785, to Scarpa, and 3,466,789, to Kare, involve the use of liquid insecticide dispensers in which the rate of liquid that is being dispensed is controlled though slow dripping of the liquid and subsequent atmospheric volatilization. While Kare may disclose a single dose dispenser for the insecticide, no disclosure is made of electrically heating the dispenser to volatilize its contents.

SUMMARY OF THE INVENTION

According to the present invention, I have discovered an insecticide dispenser that can be electrically heated with a PTC heater to dispense the insecticide. In the preferred embodiment, the dispenser of the present invention will be able to shut itself off automatically when the vaporization has commenced, or at least before the vaporization has been completed. The dispenser includes a housing with an electrical contact disposed on the sidewall that is arranged to contact the sidewall of an electrically conductive insecticide container. The container is disposed on the PTC heater (as will be described later) which is connected to a power source and is made part of the circuit with the container and produce heat. Heating the container will initiate a self-sustaining, exothermic chemical reaction in the mass of insecticide and carrier that is in the container which will volatilize the insecticide and disperse it into the room.

When the insecticide is volatilized, the container of the present invention cannot be used again, thereby preventing the possibility of injury to the user through subsequent uses or refilling it with materials that are not designed to be used with the dispenser. Moreover, the utilization of the dispenser of the present invention involves a fumigator setting up the device and then turning on the power to commence the volatilization of the insecticide. When the heating has commenced, the fumigator should promptly leave the room in which the action has been initiated and close the door, thereby containing the insecticide within the room and allowing it to do its work. The door should not be opened for a significant amount of time so as to prevent poisoning the fumigator. Since it is frequently undesirable to continue heating the container that holds the insecticide for all of the time the fumigator is out of the room because of the possibility of overheating or fire, in a further preferred embodiment of the present invention, the dispenser is designed to turn itself off by breaking the electrical circuit.

PTC heaters have been in use for many years. I have found that such heaters offer several operating advantages over conventional resistance heating elements in the heating of containers of insecticides. They generally are flat and made from doped barium titinate ceramics which have a sharp positive temperature coefficient of resistance. The PTC ceramics are designed such that below a critical temperature, the resistance of the ceramic remains at low value and is essentially contant. When a particular temperature is reached, a crystalline phase change takes place in the creamic and this abrupt change in crystal structure is accompanied by a sharp increase in the resistance at the crystalline grain boundaries. The result of this crystalline change is an increase in the heater resistance of several orders of magnitude over a very small temperature change. A barium titinate heater with a room temperature of resistance of 3.0 ohms will increase to 1000 ohms or more during the crystalline phase change. The temperature at which the crystalline phase change takes place can be adjusted in the PTC manufacturing process through the use of appropriate chemical additives and can be varied between 60 and 180 degrees centigrade, thereby providing a range of temperatures to suit various combinations of insecticides and carriers.

When used as a heater and energized with a suitable voltage by applying current to the opposite side of it, the PTC ceramic rapidly heats up to a predetermined operating temperature and then "locks in" at this temperature. This rapid warm up is due to the initial low resistance of the PTC ceramic heater which results in an internal high power input of the heater. The "lock in" is due to the abrupt increase in resistance which causes generated power to be reduced until it equals the dissipated power. At this point, a thermal equilibrium is achieved and the PTC heater self regulates itself at that temperature until it is turned off.

When the container of insecticide is placed directly upon the face of the PTC heater, an electrical circuit will be formed when using the dispenser of the present invention. Placement will cause the PTC heater to begin to heat. The circuit is between a connection disposed in the housing of the dispenser, through the insecticide container and then to the PTC heater. The heat from the PTC heater is transmitted to the container that holds the insecticide. Preferably the circuit can be broken easily by placing a movable insulator between the connection in the housing and the container. As an example of such an insulator, a plastic cap is placed on the top of the container and a cavity is be formed in it which will allow the electrical contact to enter the cavity and engage the container. When the circuit is to be broken, the cap (and the entire container, also, if desired) can be twisted to place the cap between the container and the connection, thereby preventing the flow of current. In another preferred embodiment, a mass of eutectic material is placed over an aperture in the bottom of the container. An electrically inert pin is urged against the bottom of the mass of eutectic material by a spring member that electrically connects the lower side of the PTC heater to the other side of the power supply. When the eutectic softens, the pin member will move towards the container and break the circuit automatically. Dispensing of the insecticide will continue because of the self-sustaining chemical reaction that was initiated by the PTC heater, even though the circuit has been broken.

DESCRIPTION OF THE DRAWINGS

For a fuller understanding of the nature and desired objects of this invention, reference should be made to the following detailed description taking in conjunction with the accompanyng drawings wherein like reference characters refer to corresponding parts throughout the several views of the preferred embodiments of the invention and wherein;

FIG. 1 is an elevational view, partly in cross-section of an insecticide dispenser prior to initial heating with the circuit connected to volatilize the insecticide and FIG. 2 is a similar view of the same device arranged in a way so that the circuit is broken and the insecticide is dispensed.

FIG. 3 is an elevational cross-sectional view of another embodiment of the present invention illustrating a cut-off device suitable for turning off the current to the PTC heater, automatically, before the insecticide contained in the device is completely volatilized.

FIG. 4 shows a similar view of the equipment after the current to the PTC heater has been shut off when the insecticide has been volatilized into the room which is being fumigated.

DESCRIPTION OF THE PREFERRED EMBODIMENTS

Referring now to the drawings, FIG. 1 illustrates an embodiment of the invention in which an electrically conductive insecticide container 1 is snugly fitted in a housing 3. A PTC heater 5 is disposed upon a support 7 which is formed on the inside of the side wall 3*a* of the housing 3. An electrical contact member 9 is arranged on the side wall 3*a* of the housing 3 and is arranged to urge against the container 1 so as to make the container 1, one side of an electrical circuit. The electrical contact member preferably includes a movable, spring-loaded ball 9*a* which presents its face from an aperture within the contact 9. A spring 9*b* is connected to the power supply through a lead-in wire 11.

The lead-in wire 11 extends to the contact ball 9*a* through the side wall 3*a* and the base of the housing 3 and runs external thereof to a plug 15. The lead-in wire 11 branches to electrically connect with a conductive support 17 upon which the PTC heater 5 rests so as to provide current to the lower side. As shown in FIG. 1 of the drawing, the ball 9*a* engages the electrical conductive container 1 which, in turn, rests upon the upper side of the PTC heater 5. With this arrangement, the circuit is formed between the two sides of the lead-in wire 11 with one side being established between the support 17 and the other with the bottom of the container 1. A plastic cap 12 with a spout 13 (which allows the insecticide vapors to escape during operation of the dispenser) is disposed upon the top of container 1. The plastic cap 12 also serves as a circuit breaker, as will be discussed later. Cap 12 is permanently seated upon the top of the container 1 by means of flange 1*a* which fits into an groove or recess 12*a* which is located near the top of the inner surface of cap 12.

THe mass of insecticide 2 that is held within the container 1 includes a conventional insecticide dispersed in a well-known chemical carrier such as oxygenated wax, which upon the application of heat, will produce a self-sustaining chemical reaction that will volatilize the insecticide and dispense it into the room. In the preferred embodiment, the carrier is such that it will chemically react in an exothermic chemical reaction upon the application of heat from the PTC heater 5. The chemical reaction, as is well know, is self-sustaining upon initiation and the heat from the exothermic reaction will vaporize the insecticide to disperse it into the room. When the PTC heater 5 reaches its predetermined anomaly temperature due to the heat of the reaction, it will maintain that temperature and not overheat.

Figure 2:
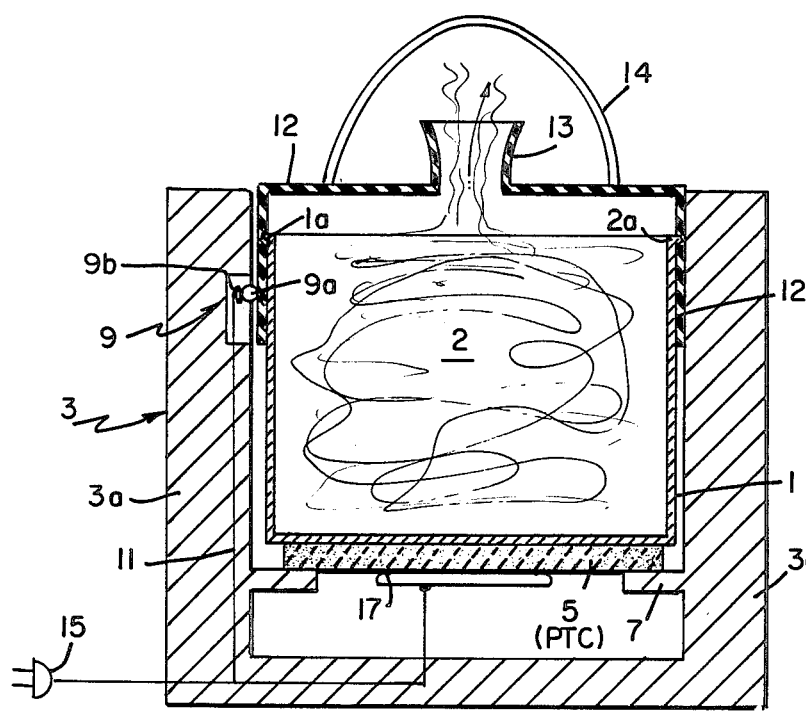

At an appropriate time after the chemical reaction in the insecticide has commenced or after the volatilization is completed, the cap 12 is turned on its axis, together with container 1, by rotating the handle 14 which will change the location of cavity 15 (comparing FIG. 1 and FIG. 2) relative to ball 9a. Since ball 9a is spring-loaded, it will enter into the cavity 15 when the cap 12 is turned. Because ball 9a no longer engages container 1 when The handle 14 is turned, the electrical circuit formed on the opposite sides of the PTC heater 5 will be broken.

After the vaporization of the insecticide has been completed, the fumigator can reenter the room, using appropriate precautionary measures to avoid inhalation of the insecticide, and disconnect the plug 15, or as described above, turn the handle 14 and the heating provided by PTC heater 5 will be terminated. Container 1 can be withdrawn by the fumigator by pulling handle 14 which will remove it from the housing 3.

Figure 3:
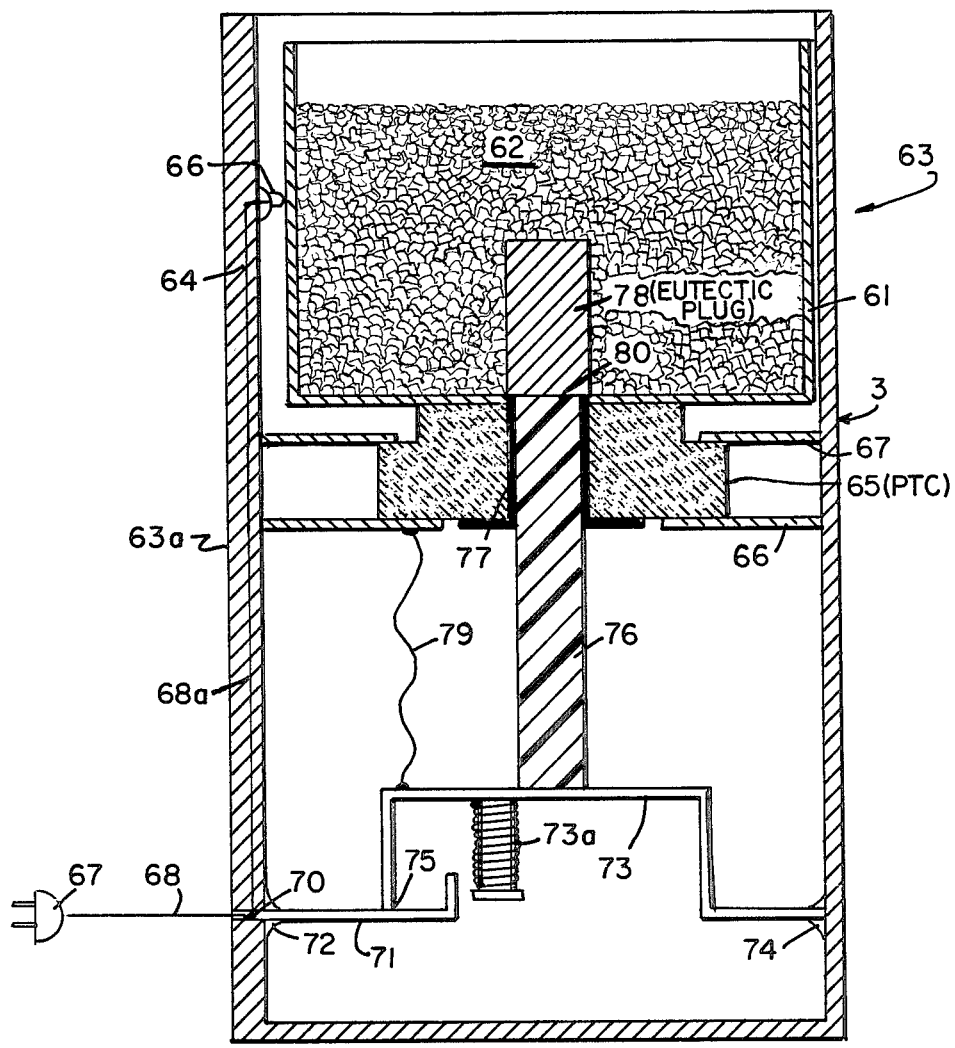
Figure 4:
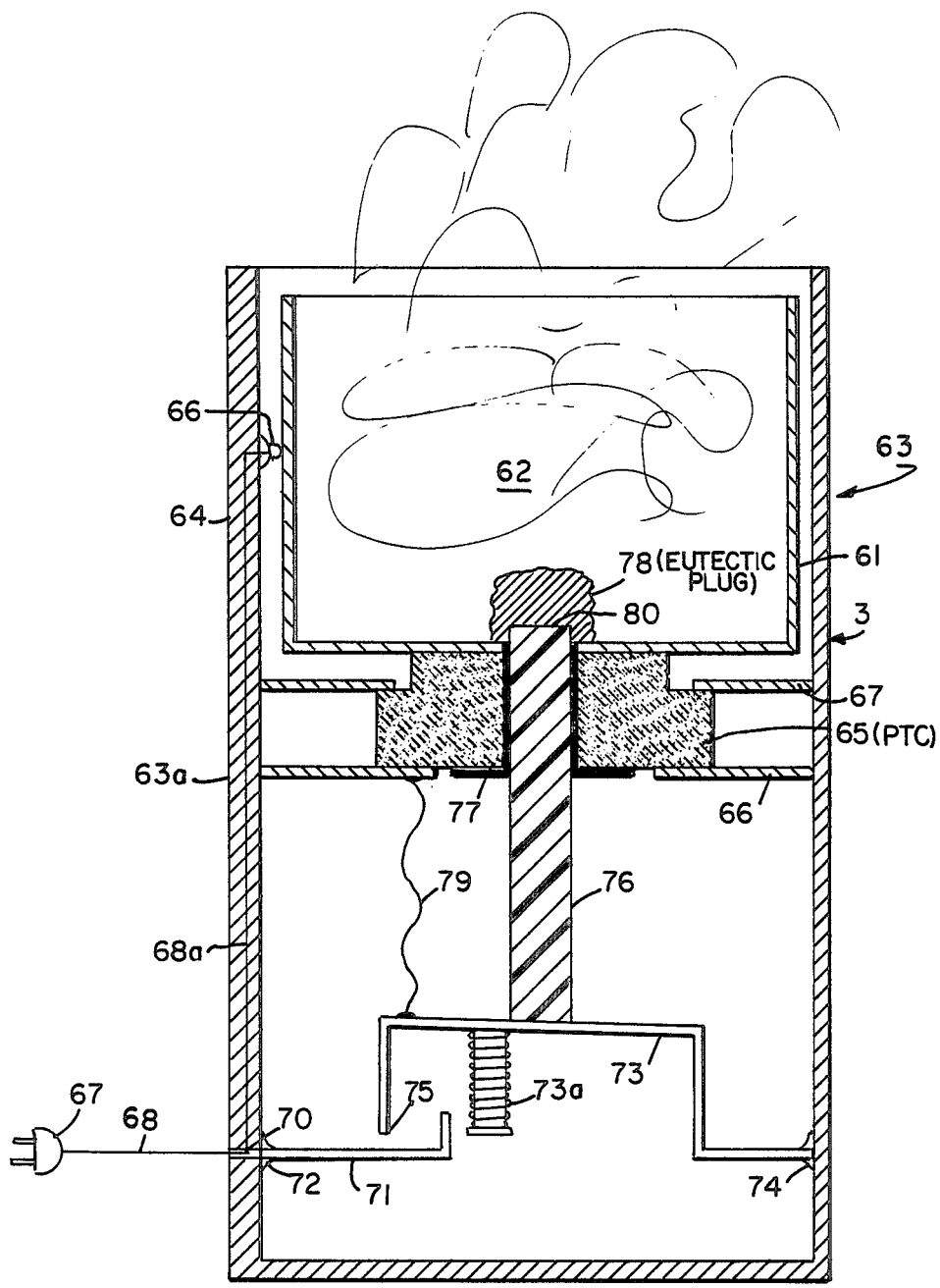

Another preferred embodiment of the present invention is shown in FIGS. 3 and 4 in which the container 61 of insecticide 62 is disposed within a housing 63 and means are provided to automatically discontinue the heating after the vaporization of the insecticide has commenced and preferably before it is completed.

The electrically conductive container 61 holding a charge of insecticide 62, as described previously, is disposed within a insecticide dispenser 63 having a side wall 63a and a base 63b. The container 61 rests upon the PTC heater 65 as described previously. The PTC heater 65 is disposed upon an electrically conductive shelf 66 which carries current to one side of the heater, as will be described later. A retainer 67 is disposed on the side wall 63a of the dispenser and holds the top of the PTC heater 65 firmly in place.

Current is carried to one side of the PTC heater 65 through the electrically conductive container 61 which is in contact with a spring-loaded conductive button 66 that is fitted into the side wall 63a of the dispenser 63. The button 66 extends inwardly from the side wall 63a of the dispenser 63 to slidably engage the side wall of the container 61. When the plug 67 is placed in a standard wall receptacle, current will pass through line 68 to contact button 66. The lead-in wire 68 splits at location 70 and one side extends through the side wall 63a while the other side is attached to electrical contact 71. Electrical contact 71 is rigidly disposed on the side wall 63a of the dispenser 63. Rigid disposition is obtained through the use of a support 72 that extends inwardly from the side wall 64. An electrical connection is made to the under side of the PTC heater 65 through spring-loaded (73a) bracket 72 that is also rigidly attached to the side wall 63a of the dispenser 63. A connecting wire 79 connects bracket 73 to electrically conductive shelf 66. Spring-loaded bracket 73 can pivot about support 74 to open or close the circuit at location 75. The spring-loaded bracket 73 is urged toward the closed position at location 75 by means of a plastic pin 76 which urges against an opening in the bottom wall of the container 61. That opening is covered by a slug of eutectic 78 that is attached to it. The slug of eutectic, 60/40 solder for example, softens at a relatively low temperature. Other eutectics can also be used which will precisely soften at a desired temperature and will be compatible with the exact temperature that an electrical cutoff is desired. The pin 76 is slidably received through the center of the PTC heater 65 and held within a sleeve 77, preferably made of a high melting plastic such as is used to form the pin 76. It is possible to use other electrically inert materials such as asbestos which will not degrade upon heating at the relatively low temperatures that are established in the PTC heater 65.

When the chemical reaction in the charge of insecticide 62 is initiated, the sealing slug of eutectic 78 begins to soften due to the exothermic nature of the chemical reaction. Even a slight softening will cause the plastic pin 76 to move upwardly and disengage the electrical connection at location 75. The disengagement of the electrical connection at location 75 is best shown in FIG. 4. Current cannot be conveyed to the lower side of the PTC heater 65 by means of the connecting wire 82 when the connection at location 75 is broken. The eutectic slug 78 does not melt completely, but rather softens to allow the pin 76 to enter the container through the aperture 80 located in its base. Only a sight movement of the pin 76 will produce a breaking of the circuit at location 75, thereby discontinuing the current but allowing the volatilization of the mass of insecticide to continue to completion. Replacement of a fresh can of insecticide with a new eutectic slug that is flush with the bottom of the container will automatically reset the electrical connection at location 75 which will enable the fumigator to continue to use the insecticide dispenser.

It is apparent that modifications and changes can be made within the spirit and scope of the present invention but it is my intention only to be limited by the appended claims.

As my invention I claim:

1. An insecticide dispenser including a housing, a PTC heater disposed therein, said PTC heater having an upper side and a lower side and an electrically conductive container for an insecticide disposed on the upper side of said PTC heater; and one side of a power supply means being connected to said conductive container and, in turn, to the upper side of said PTC heater; and an other side of the power supply being connected to the lower side of said PTC heater, whereby when said electrically conductive container is disposed on said PTC heater, a circuit will be formed on both sides of said PTC heater through said container, and further whereby heat is provided to initiate an exothermic self-sustaining chemical reaction in said container to volatilize insecticide therein.

2. The insecticide dispenser according to claim 1 wherein said one side of a power supply is connected to said container through a spring means disposed on a side wall of said housing, said spring means engaging said container whereby to form an electrical connection between said spring means and said container.

3. The insecticide dispenser according to claim 2 further including electrical cut-off means arranged to stop the flow of current to one side of said PTC heater.

4. The insecticide dispenser according to claim 1 wherein said container has an electrically inert cap with a vent disposed on the top thereof and further including cavity means on a side of said cap to allow said spring means to enter said cap and engage a side wall of said container.

5. The insecticide dispenser according to claim 4 wherein said cap is permanently secured to said container whereby contents of said container cannot be spilled or other ingredients conveniently added.

6. The insecticide dispenser according to claims 2 or 3 further including a thermal shut-off, said thermal shut-off including an aperture in a bottom of said container and slug of eutectic covering said aperture; and
   a pin having two ends, one end of which engages an outside of said aperture; and
   resilient means engaging the other end of said pin, whereby upon softening of said eutectic, said resilient means will force said pin into said aperture, whereby electrical current between said resilient means and said PTC Heater will be broken.

7. The insecticide dispenser according to claim 6 wherein the pin is an electrical insulator and extends through an aperture in said PTC heater to urge against said container.

8. The insecticide dispenser according to claim 7 wherein said PTC heater rests upon an electrically conductive shelf and electrical connection between said resilient means and said PTC heater is through said shelf.

9. The insecticide dispenser according to claim 8 further including an electrically inert sleeve disposed in the aperture in said PTC heater.

* * * * *